US012684612B2

(12) United States Patent
Maamari et al.

(10) Patent No.: US 12,684,612 B2
(45) Date of Patent: Jul. 14, 2026

(54) PRIORITY HANDLING FOR EXTENDED REALITY TRAFFIC

(71) Applicant: QUALCOMM Incorporated, San Diego, CA (US)

(72) Inventors: Diana Maamari, San Diego, CA (US); Ahmed Elshafie, San Diego, CA (US); Mickael Mondet, Louannec (FR); Wei Yang, San Diego, CA (US); Prashanth Haridas Hande, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 836 days.

(21) Appl. No.: 17/812,037

(22) Filed: Jul. 12, 2022

(65) Prior Publication Data

US 2024/0023157 A1     Jan. 18, 2024

(51) Int. Cl.
*H04W 72/566* (2023.01)
*H04L 1/1812* (2023.01)
*H04W 72/1268* (2023.01)

(52) U.S. Cl.
CPC ......... *H04W 72/569* (2023.01); *H04L 1/1812* (2013.01); *H04W 72/1268* (2013.01)

(58) Field of Classification Search
CPC ............ H04W 72/569; H04W 72/1268; H04L 1/1812; H04L 1/1671; H04L 1/1854
See application file for complete search history.

(56) References Cited

U.S. PATENT DOCUMENTS

| | | | |
|---|---|---|---|
| 2016/0219088 A1* | 7/2016 | Ma | H04L 65/765 |
| 2019/0053250 A1* | 2/2019 | He | H04W 28/00 |
| 2020/0036501 A1* | 1/2020 | Gao | H04W 72/53 |
| 2020/0154501 A1* | 5/2020 | Cheng | H04W 4/70 |
| 2020/0314900 A1* | 10/2020 | Hosseini | H04W 72/56 |
| 2021/0144580 A1* | 5/2021 | Alfarhan | H04W 76/27 |
| 2021/0184806 A1* | 6/2021 | Yang | H04W 74/04 |
| 2021/0211239 A1* | 7/2021 | Fan | H04L 49/9057 |
| 2022/0104262 A1* | 3/2022 | Miao | H04W 74/0825 |
| 2024/0357577 A1* | 10/2024 | Singh | H04W 72/566 |

FOREIGN PATENT DOCUMENTS

WO     WO-2022059109 A1 *    3/2022    ............ H04W 72/02

* cited by examiner

*Primary Examiner* — Ankur Jain
(74) *Attorney, Agent, or Firm* — Harrity & Harrity, LLP

(57) ABSTRACT

Various aspects of the present disclosure generally relate to wireless communication. In some aspects, a user equipment (UE) may determine two or more colliding uplink transmissions, wherein the two or more colliding uplink transmissions include first traffic and second traffic. The UE may select, from the two or more colliding uplink transmissions, one of the first traffic or the second traffic based at least in part on a first stage priority handling and a second stage priority handling, wherein the first traffic or the second traffic is selected based at least in part on one of three possible priority levels assigned to each of the two or more colliding uplink transmissions. The UE may transmit, to a network node, the one of the first traffic or the second traffic that is selected. Numerous other aspects are described.

30 Claims, 6 Drawing Sheets

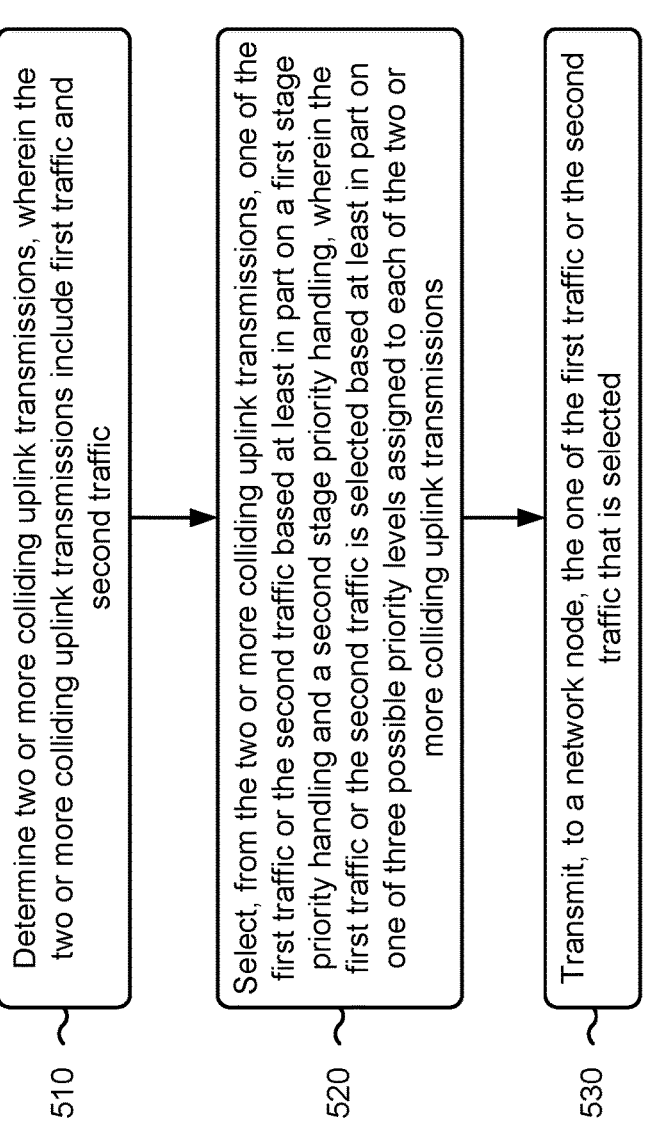

Determine two or more colliding uplink transmissions, wherein the two or more colliding uplink transmissions include first traffic and second traffic Select, from the two or more colliding uplink transmissions, one of the first traffic or the second traffic based at least in part on a first stage priority handling and a second stage priority handling, wherein the first traffic or the second traffic is selected based at least in part on one of three possible priority levels assigned to each of the two or more colliding uplink transmissions Transmit, to a network node, the one of the first traffic or the second traffic that is selected

PRIORITY HANDLING FOR EXTENDED REALITY TRAFFIC

FIELD OF THE DISCLOSURE

Aspects of the present disclosure generally relate to wireless communication and to techniques and apparatuses for priority handling for extended reality (XR) traffic.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory;

and one or more processors, coupled to the memory, configured to: determine two or more colliding uplink transmissions, wherein the two or more colliding uplink transmissions include first traffic and second traffic; select, from the two or more colliding uplink transmissions, one of the first traffic or the second traffic based at least in part on a first stage priority handling and a second stage priority handling, wherein the first traffic or the second traffic is selected based at least in part on one of three possible priority levels assigned to each of the two or more colliding uplink transmissions; and transmit, to a network node, the one of the first traffic or the second traffic that is selected.

In some implementations, a method of wireless communication performed by a UE includes determining two or more colliding uplink transmissions, wherein the two or more colliding uplink transmissions include first traffic and second traffic; selecting, from the two or more colliding uplink transmissions, one of the first traffic or the second traffic based at least in part on a first stage priority handling and a second stage priority handling, wherein the first traffic or the second traffic is selected based at least in part on one of three possible priority levels assigned to each of the two or more colliding uplink transmissions; and transmitting, to a network node, the one of the first traffic or the second traffic that is selected.

In some implementations, a non-transitory computer-readable medium storing a set of instructions for wireless communication includes one or more instructions that, when executed by one or more processors of a UE, cause the UE to: determine two or more colliding uplink transmissions, wherein the two or more colliding uplink transmissions include first traffic and second traffic; select, from the two or more colliding uplink transmissions, one of the first traffic or the second traffic based at least in part on a first stage priority handling and a second stage priority handling, wherein the first traffic or the second traffic is selected based at least in part on one of three possible priority levels assigned to each of the two or more colliding uplink transmissions; and transmit, to a network node, the one of the first traffic or the second traffic that is selected.

In some implementations, an apparatus for wireless communication includes means for determining two or more colliding uplink transmissions, wherein the two or more colliding uplink transmissions include first traffic and second traffic; means for selecting, from the two or more colliding uplink transmissions, one of the first traffic or the second traffic based at least in part on a first stage priority handling and a second stage priority handling, wherein the first traffic or the second traffic is selected based at least in part on one of three possible priority levels assigned to each of the two or more colliding uplink transmissions; and means for transmitting, to a network node, the one of the first traffic or the second traffic that is selected.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example process associated with priority handling for XR traffic, in accordance with the present disclosure.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
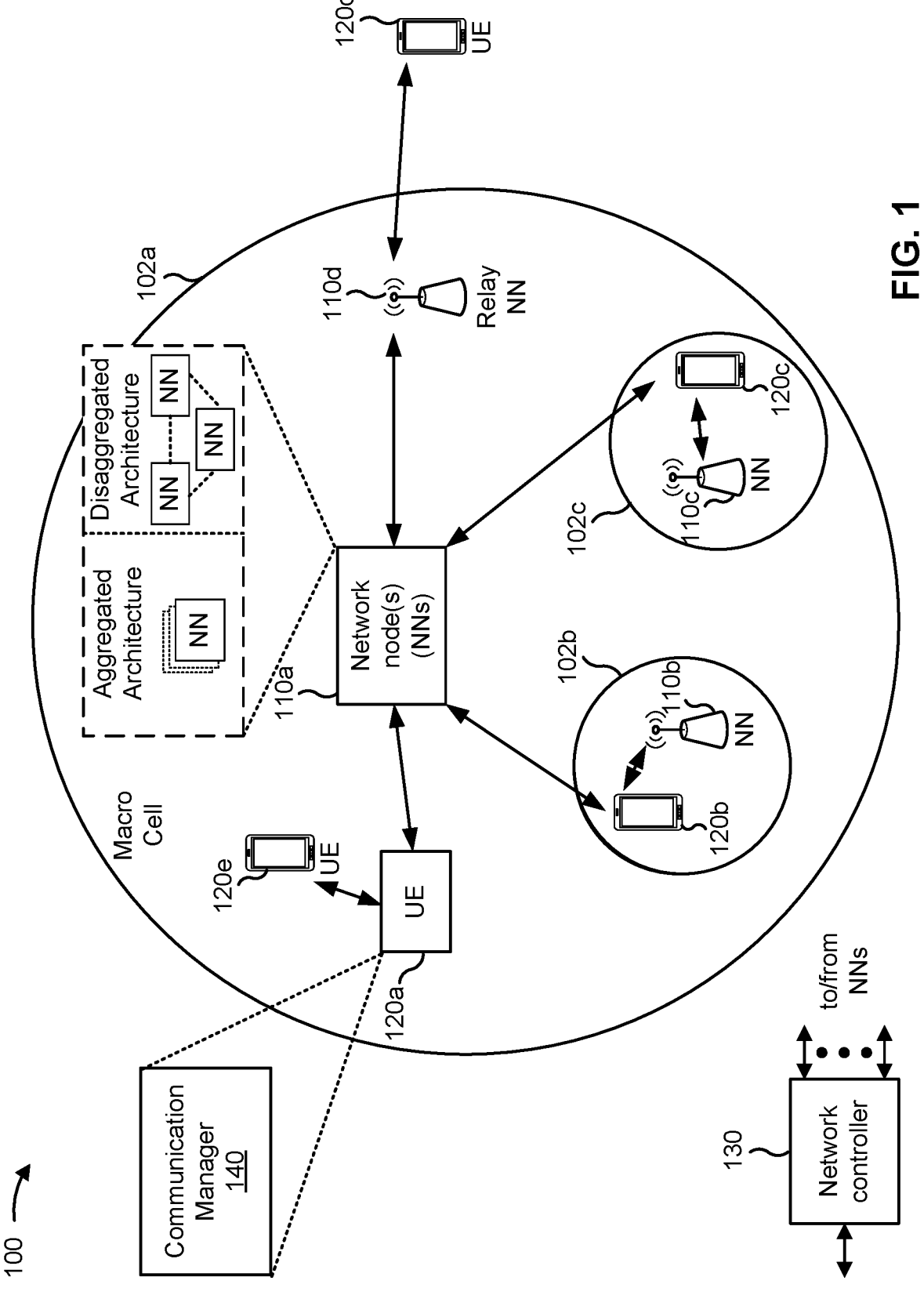
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120_a_ and UE 120_e_) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may determine two or more colliding uplink transmissions, wherein the two or more colliding uplink transmissions include first traffic and second traffic; select, from the two or more colliding uplink transmissions, one of the first traffic or the second traffic based at least in part on a first stage priority handling and a second stage priority handling, wherein the first traffic or the second traffic is selected based at least in part on one of three possible priority levels assigned to each of the two or more colliding uplink transmissions; and transmit, to a network node, the one of the first traffic or the second traffic that is selected. Additionally, or alternatively, the communication manager 140 may perform one or more other operations described herein.

As indicated above, FIG. 1 is provided as an example. Other examples may differ from what is described with regard to FIG. 1.

Figure 2:
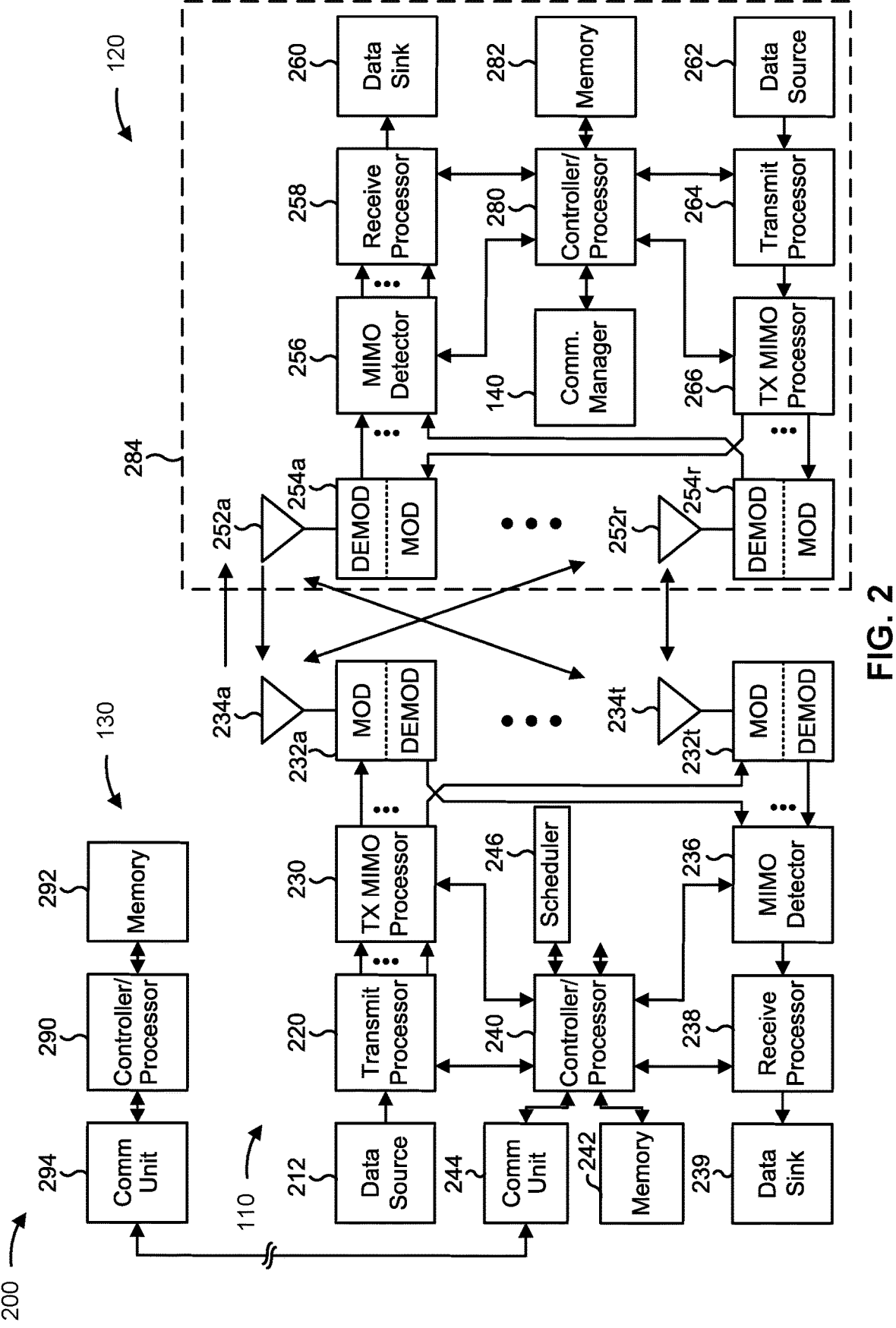
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234_a_ through 234_t_, such as T antennas (T≥1). The UE 120 may be equipped with a set of antennas 252_a_ through 252_r_, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples.

An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-6).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-6).

The controller/processor 240 of the network node 110, the controller/processor 280 of the UE 120, and/or any other component(s) of FIG. 2 may perform one or more techniques associated with priority handling for XR traffic, as described in more detail elsewhere herein. For example, the controller/processor 240 of the network node 110, the controller/processor 280 of the UE 120, and/or any other component(s) of FIG. 2 may perform or direct operations of, for example, process 500 of FIG. 5, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 500 of FIG. 5, and/or other processes as described herein. In some examples, executing instructions may include running the instructions, converting the instructions, compiling the instructions, and/or interpreting the instructions, among other examples.

In some aspects, a UE (e.g., UE 120) includes means for determining two or more colliding uplink transmissions, wherein the two or more colliding uplink transmissions include first traffic and second traffic; means for selecting, from the two or more colliding uplink transmissions, one of the first traffic or the second traffic based at least in part on a first stage priority handling and a second stage priority handling, wherein the first traffic or the second traffic is selected based at least in part on one of three possible priority levels assigned to each of the two or more colliding uplink transmissions; and/or means for transmitting, to a network node, the one of the first traffic or the second traffic that is selected. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
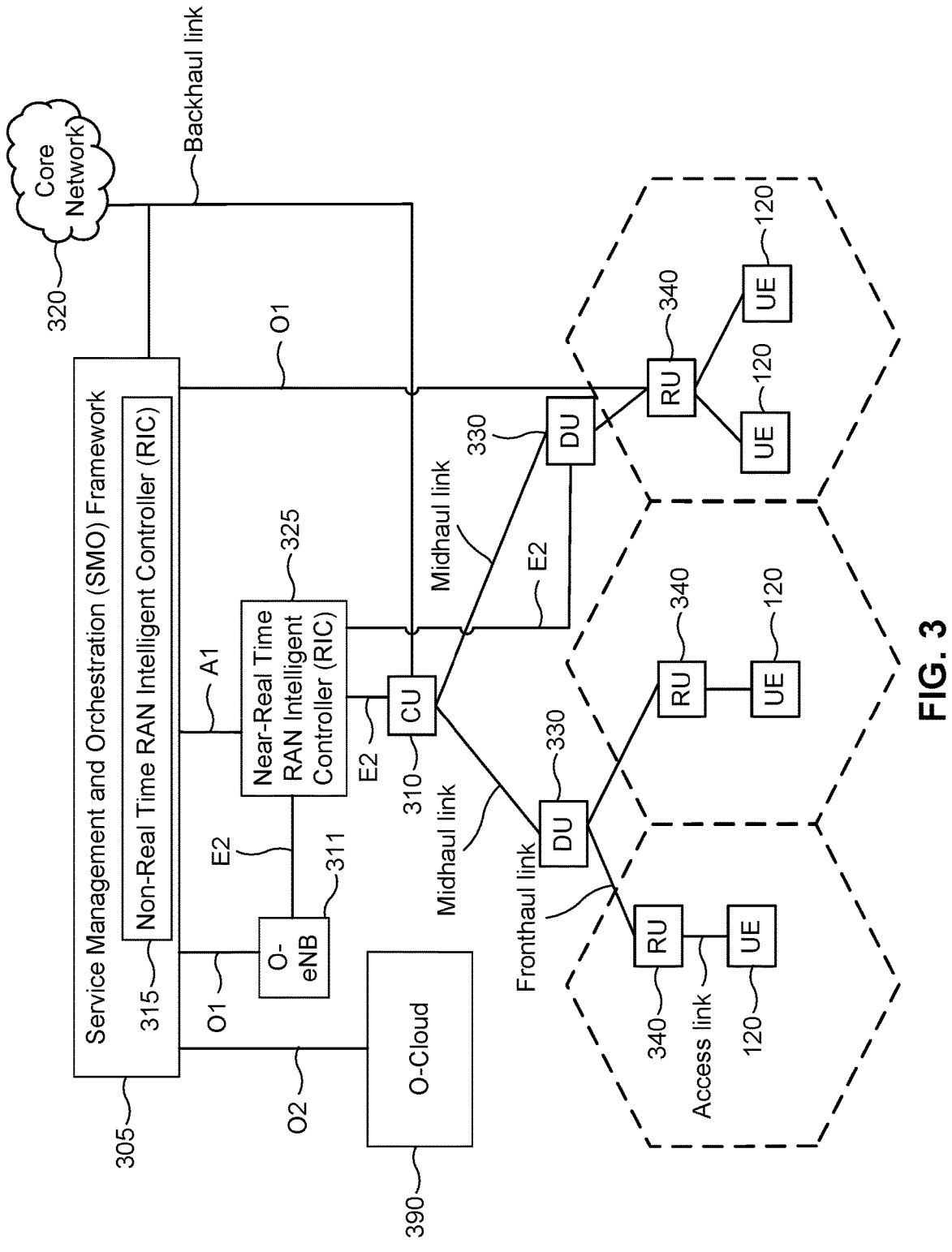
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Uplink multiplexing and prioritization may be based at least in part on a PHY layer priority. Based at least in part on PHY layer priorities, an uplink transmission may be dropped or prioritized. For example, a first uplink transmission may be associated with a first priority and a second uplink transmission may be associated with a second priority. When the first priority is higher than the second priority, the first uplink transmission may be transmitted and the second uplink transmission may be dropped. When the second priority is higher than the first priority, the second uplink transmission may be transmitted and the first uplink transmission may be dropped. The uplink multiplexing and prioritization may define dropping mechanisms for collisions between enhanced Mobile Broadband (eMBB) traffic and ultra-reliable low latency communications (URLLC) traffic, but does not include XR cases.

Intra-UE or inter-UE multiplexing or prioritization with XR traffic may be considered since a differentiation with URLLC traffic may be needed, and a differentiation between XR traffic with other XR traffic flows may be needed. XR traffic having stringent requirements like a short packet delay budget (PDB) or higher reliability may need to be prioritized, not only over eMBB traffic but also over other XR traffic. Considering XR services and multiple flows of XR characteristics, a priority handling for XR needs to be improved because in a current design, eMBB traffic may be associated with a low priority and URLLC traffic or other important traffic may be associated with a high priority. A single XR service may have various traffic flows, and all of the traffic flows may need to be treated as having a higher priority than eMBB traffic, but not necessarily as having a high priority as URLLC traffic. Prioritizing one traffic flow among multiple XR traffic flows may be desirable, so a two-level approach of priority (e.g., high priority and low priority) may be insufficient for handling such cases. An XR-specific priority handling may be required, such that a UE may prioritize XR traffic over eMBB traffic, while prioritizing URLLC traffic over the XR traffic.

A PHY layer prioritization may be needed when a UE MAC layer has generated two or more MAC protocol data units (PDUs) for corresponding PHY layer grants. For example, the UE MAC layer may generate an XR MAC PDU, an URLLC MAC PDU, and an eMBB MAC PDU. In a past approach, two PHY layer priority levels (e.g., "0" and "1") may be available, which may be insufficient to resolve an overlapping scenario in which the two or more MAC PDUs are generated for the corresponding PHY layer grants.

With dynamic scheduling and a dynamic prioritization indication, a network node may assign either a high priority or a low priority to XR traffic, depending on a relative importance of other traffic that collides with an XR uplink transmission. However, for semi-statically configured uplink transmissions, corresponding priority levels may be fixed and cannot be flexibly changed from transmission to transmission based at least in part on which transmissions overlap with the semi-static uplink transmissions. The semi-static uplink transmissions may include configured grant (CG) physical uplink shared channel (PUSCH) transmissions or hybrid automatic repeat request acknowledgement (HARQ-ACK) transmissions for semi-persistent scheduling (SPS) physical downlink shared channel (PDSCH) transmissions or scheduling requests (SRs). For uplink channel conditions, XR traffic may be multiplexed with low priority eMBB traffic or URLLC traffic, but may lead to a reduced reliability for the XR traffic and/or a reduced reliability for the URLLC traffic, and may also impact a latency.

In various aspects of techniques and apparatuses described herein, a UE may determine two or more colliding uplink transmissions, where the two or more colliding uplink transmissions may include first traffic and second traffic. The two or more colliding uplink transmissions may include XR traffic, URLLC traffic, and/or eMBB traffic. The first traffic, when colliding with the second traffic, may at least partially overlap in time with the second traffic. The UE may select, from the two or more colliding uplink transmissions, one of the first traffic or the second traffic based at least in part on a first stage priority handling and a second stage priority handling. The UE may select the first traffic or the second traffic based at least in part on one of three possible priority levels (e.g., P0, P1, and P2) assigned to each of the two or more colliding uplink transmissions. The first stage priority handling may be based at least in part on a two-level priority assigned to the two or more colliding uplink transmissions, where the two-level priority may include a high priority (e.g., P1) and a low priority (e.g., P0). The first traffic and the second traffic may be associated with the high priority and remaining traffic from the two or more colliding uplink transmissions may be associated with the low priority. The second stage priority handing may be based at least in part on a third level priority (e.g., P2) associated with various metrics, such as a delay budget. The delay budget may define the upper bound for an amount of time for which a packet may be delayed from the UE to the network node. The UE may transmit, to a network node, the one of the first traffic or the second traffic that is selected. The UE may drop one of the first traffic or the second traffic that is not selected. As a result, when at least one of the first traffic and the second traffic is XR traffic, a highest priority traffic may be transmitted to the network and a remaining traffic may be dropped.

Figure 4:
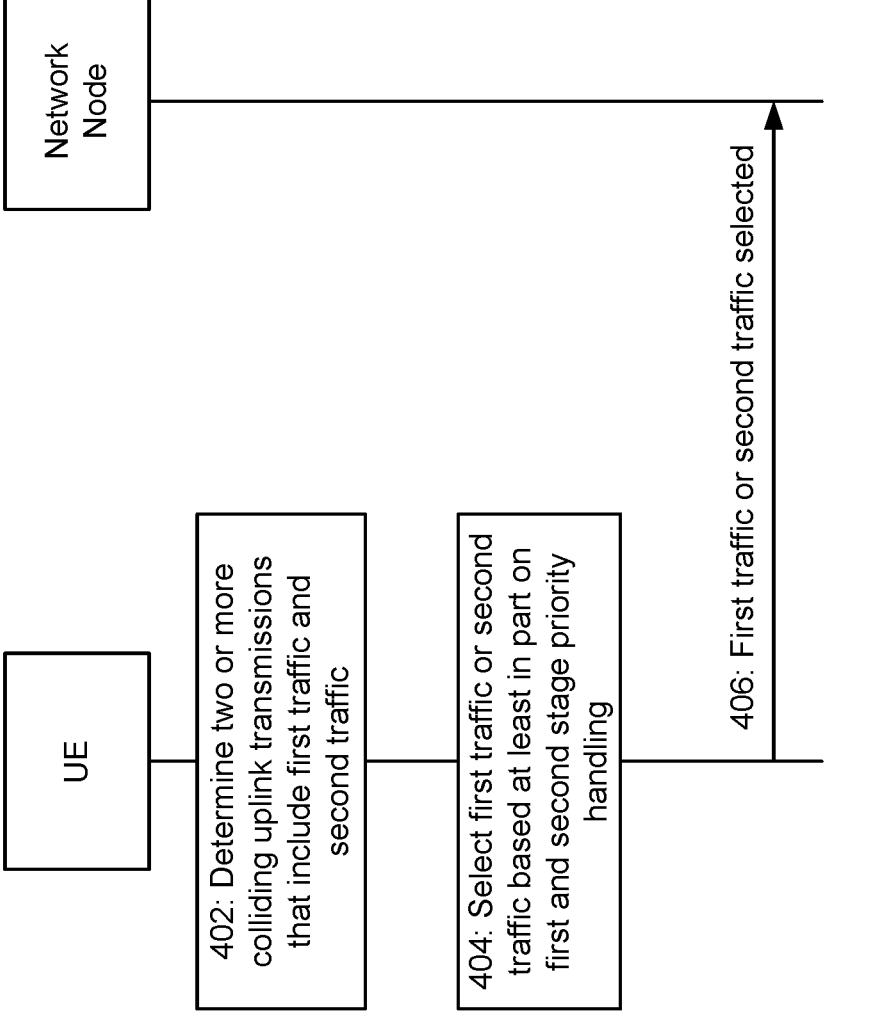
FIG. 4 is a diagram illustrating an example associated with priority handling for extended reality (XR) traffic, in accordance with the present disclosure.

FIG. 4 is a diagram illustrating an example 400 associated with priority handling for XR traffic, in accordance with the present disclosure. As shown in FIG. 4, communication may occur between a UE (e.g., UE 120) and a network node (e.g., network node 110). In some aspects, the UE and the network node may be included in a wireless network, such as wireless network 100.

As shown by reference number 402, the UE may determine two or more colliding uplink transmissions, where the two or more colliding uplink transmissions may include first traffic and second traffic. The two or more colliding uplink transmissions may include XR traffic, URLLC traffic, and/or eMBB traffic. The first traffic, when colliding with the second traffic, may at least partially overlap in time with the second traffic. The first traffic may at least partially overlap in time with the second traffic, thereby causing a collision between the first traffic and the second traffic.

In some aspects, the XR traffic may include XR data, augmented reality (AR) data, and/or virtual reality (VR) data. The XR traffic may include data collected, inferred, processed, and/or shared from both consumers and by standards to create and facilitate immersive experiences. The XR traffic may include personally identifiable information and personal data, biometrically-inferred data, and/or sensor data to enable six degrees of freedom, presence, persistence, and immersion.

As shown by reference number 404, the UE may select, from the two or more colliding uplink transmissions, one of the first traffic or the second traffic based at least in part on a first stage priority handling and a second stage priority handling. At least one traffic from the two or more colliding uplink transmissions may be XR traffic. The UE may select the first traffic or the second traffic based at least in part on one of three possible priority levels (e.g., P0, P1, and P2) assigned to each of the two or more colliding uplink transmissions. For example, P0 may correspond to a low priority, P1 may correspond to a high priority, and P2 may correspond to a priority level that is higher than P0 and P1, where P2 may be based at least in part on various metrics such as a delay budget. P2 may correspond to a third priority level.

In some aspects, during the first stage priority handling, the UE may evaluate the plurality of colliding uplink transmissions, which may include the first traffic and the second traffic. The UE may evaluate the plurality of colliding uplink transmissions by assigning a two-level priority to each traffic of the plurality of colliding uplink transmissions. The two-level priority may include a high priority or a low priority. In other words, for each traffic of the plurality of colliding uplink transmissions, the UE may determine whether the traffic is high priority or low priority. During the first stage priority handling, low priority traffic may be discarded and high priority traffic may be kept.

In some aspects, both the first traffic and the second traffic may be assigned the high priority, and may be kept after the first stage priority handling. Remaining traffic may be assigned the low priority, and may be discarded after the first stage priority handling. For example, the first traffic may be XR traffic and the second traffic may also be XR traffic. As another example, the first traffic may be XR traffic and the second traffic may be non-XR traffic, where the non-XR traffic may be URLLC traffic.

As an example, the first traffic may be XR traffic and the second traffic may be URLLC traffic, and the remaining traffic may include third traffic, where the third traffic may be eMBB traffic. The XR traffic and URLLC traffic may be associated with high priority, and the eMBB traffic may be associated with low priority. During the first stage priority handling, the XR traffic and the URLLC traffic may be kept, and the eMBB traffic may be discard.

In some aspects, after both the first traffic and the second traffic are kept after the first stage priority handling (e.g., both the first traffic and the second traffic are high priority), the UE may perform the second stage priority handling, during which time the UE may select one of the first traffic or the second traffic. During the second stage priority handling, the UE may evaluate the first traffic and the second traffic to determine which of the first traffic or the second traffic should be prioritized and transmitted, and which of the first traffic or the second traffic should be dropped. The UE may perform the second stage priority handling based at least in part on one or more metrics (e.g., delay budget), which the UE may receive from the network node via a static configuration or a dynamic indication. The UE may perform the second stage priority handling based at least in part on the third level priority, which may be based at least in part on the one or more metrics.

In some aspects, the UE may select one of the first traffic or the second traffic, using the second stage priority handling, based at least in part on the delay budget associated with the first traffic and the second traffic. The delay budget may be a PDB, a PDU set delay budget, a PDCP discard time, a remaining PDB, or a delay metric that accounts for jitter. In some aspects, the UE may select one of the first traffic or the second traffic, using the second stage priority handling, based at least in part on Fifth Generation quality of service (QoS) identifier (5QI) metrics for QoS flows, where the metrics for the QoS flows may include a default priority level, a packet delay budget, or a packet error rate. In some aspects, the UE may select one of the first traffic or the second traffic, using the second stage priority handling, based at least in part on a mapping to an intra/predicted (UP) frame prioritization indicated by one or more of the first traffic or the second traffic. In some aspects, the UE may select one of the first traffic or the second traffic, using the second stage priority handling, based at least in part on an adaptive delay metric in relation to a threshold.

In some aspects, PHY layer priorities may be enhanced to consider the XR traffic. The first stage priority handling may involve a dropping depending on the two-level priority assigned to uplink channels. The two-level priority may include the high priority and the low priority. Lower priority traffic (e.g., eMBB traffic) may be dropped, and higher priority traffic (e.g., XR traffic and/or URLLC traffic) may not be dropped. The second stage priority handling may be defined to solve for overlapping higher priorities, which may occur when XR traffic collides with URLLC traffic, or when XR traffic collides with other XR traffic (e.g., since both are high priority). The UE may perform the second state priority handling using a combination of four possible approaches. During the second stage priority handling, the UE may select a single traffic to be transmitted, while other traffic may be dropped.

In some aspects, during the second stage priority handling, the UE may evaluate the first traffic (or first packet or first MAC PDU) and the second traffic (or second packet or second MAC PDU) to determine which of the first traffic or the second traffic should be dropped, and which of the first traffic or the second traffic should be transmitted to the network node. Traffic that is transmitted may be prioritized over traffic that is dropped. The first traffic and the second traffic may include URLLC traffic, XR traffic, and/or different instances of XR traffic. The first traffic and the second traffic may both be associated with high priority traffic, so a third metric priority may be used. The third metric priority may be based at least in part on a delay budget (or PDB). In some cases, the UE may evaluate more than two pieces of traffic to determine which traffic should be dropped (e.g., multiple pieces of traffic) and which traffic should be transmitted (e.g., a single piece of traffic).

In some aspects, during the second stage priority handling, in a first approach, the UE may determine which of the first traffic or the second traffic should be dropped and/or transmitted based at least in part on a delay budget of a packet (or traffic) being transmitted. For example, the UE may determine which of the first traffic or the second traffic should be dropped and/or transmitted based at least in part on the PDB, the PDU set delay budget, the PDCP discard time, the remaining PDB, and/or the delay metric that accounts for jitter. For XR applications, a granularity of application data may be referred to as a packet data unit set, which may be associated with the PDU set delay budget. Depending on a lower or higher PDB, PDU set delay budget, PDCP discard time, remaining PDB, and/or delay metric, between the first traffic and the second traffic, the UE may prioritize the first traffic by dropping the second traffic and transmitting the first traffic, or vice versa.

In some aspects, during the second stage priority handling, in a second approach, the UE may determine which of the first traffic or the second traffic should be dropped and/or transmitted based at least in part on the 5QI metrics for QoS flows. For example, the UE may determine which of the first traffic or the second traffic should be dropped and/or transmitted based at least in part on entries of a default priority level, a PDB, a packet error rate, or any other metrics associated with packet data unit sets. Depending on the entries of the default priority level, lower or higher PDBs, higher or lower packet error rates, and/or higher or lower other metrics, between the first traffic and the second traffic, the UE may prioritize the first traffic by dropping the second traffic and transmitting the first traffic, or vice versa.

In some aspects, during the second stage priority handling, in a third approach, the UE may determine which of the first traffic or the second traffic should be dropped and/or transmitted based at least in part on the mapping to the I/P frame prioritization, which may be indicated by a packet. Depending on whether the first traffic and the second traffic are associated with an I-frame or a P-frame, the UE may prioritize the first traffic by dropping the second traffic and transmitting the first traffic, or vice versa. I-frames may be prioritized over P-frames, or vice versa.

In some aspects, during the second stage priority handling, in a fourth approach, the UE may determine which of the first traffic or the second traffic should be dropped and/or transmitted based at least in part on the adaptive delay metric. For example, when a difference between an associated delay budget and a PDB or PDU set delay budget satisfies a threshold (e.g., the associated delay budget is far from the PDB or PDU set delay budget), a flow may be assigned a PHY layer priority that is lower than URLLC traffic. However, when the difference between the associated delay budget and the PDB or PDU set delay budget does not satisfy the threshold (e.g., the associated delay budget is close to the PDB or PDU set delay budget), the flow may be assigned a higher PHY layer priority. Depending on a lower or higher adaptive delay metric, between the first traffic and the second traffic, the UE may prioritize the first traffic by dropping the second traffic and transmitting the first traffic, or vice versa.

In some aspects, the UE may determine which of the first traffic or the second traffic should be dropped and/or transmitted based at least in part on a combination of the delay budget of the packet being transmitted, the 5QI metrics for the QoS flows, the mapping to the FP frame prioritization, and the adaptive delay metric.

In some aspects, the network node may transmit, to the UE, a configuration that configures a second stage priority indication, which may be associated with the delay budget of the packet being transmitted, the 5QI metrics for the QoS flows, the mapping to the FP frame prioritization, and/or the adaptive delay metric. In other words, the network node may configure different metrics, which may enable the UE to determine which of the first traffic or the second traffic should be dropped and/or transmitted. The network node may configure the metrics via a layer 3 (L3) configuration, or the network node may dynamically indicate the metrics using layer 1 (L1) or layer 2 (L2) signaling. For example, when an adaptive delay budget or a remaining packet delay budget are updated, a priority may be updated using an L3/L2/L1 indication.

In some aspects, the UE may determine, based at least in part on the first stage priority handling, that the first traffic collides with third traffic from the plurality of colliding uplink transmissions, and that the first traffic has a higher priority than the third traffic. The first traffic may be an XR SR, an XR HARQ-ACK feedback, or an XR PUSCH transmission. The third traffic may be persistent or semi-persistent channel state information (P/SP-CSI) on a physical uplink control channel (PUCCH), an eMBB SR, an eMBB HARQ-ACK feedback, or an eMBB PUSCH transmission.

In some aspects, the first traffic may be an XR SR, an XR HARQ-ACK feedback, or an XR PUSCH transmission. The second traffic may be a URLLC SR, a URLLC HARQ-ACK feedback, or a URLLC PUSCH transmission. In some aspects, the UE may drop one of the first traffic or the second traffic based at least in part on a low priority associated with the first traffic or the second traffic. In some aspects, the first traffic and the second traffic may be associated with a same priority, and the UE may select one of the first traffic or the second traffic based at least in part on the second stage priority handling.

In some aspects, scenarios for intra-UE uplink control information (UCI) or data may occur when an XR SR collides with other UCIs/data. In some aspects, when an XR SR collides with a URLLC SR, the UE may drop a low priority XR SR (e.g., either the XR SR or the URLLC SR depending on which of the XR SR or the URLLC SR is associated with the low priority). When both the XR SR and the URLLC SR are associated with the same priority, the UE may rely on the second stage priority handling, which may be based at least in part on the third metric priority involving the delay budget. In some aspects, when an XR SR collides with a URLLC HARQ-ACK, the UE may drop a low priority XR SR or a low priority URLLC HARQ-ACK. When both the XR SR and the URLLC HARQ-ACK are associated with the same priority, the UE may rely on the second stage priority handling. In some aspects, when an XR SR collides with P/SP-CSI on a PUCCH, the UE may drop the P/SP-CSI on the PUCCH.

In some aspects, when an XR SR collides with a URLLC PUSCH, the UE may drop a low priority XR SR or a low priority URLLC PUSCH. When both the XR SR and the URLLC PUSCH are associated with the same priority, the UE may rely on the second stage priority handling. In some aspects, when an XR SR collides with an eMBB SR, the UE may drop the eMBB SR. In some aspects, when an XR SR collides with an eMBB HARQ-ACK, the UE may drop the eMBB HARQ-ACK. In some aspects, when an XR SR collides with an eMBB PUSCH, the UE may drop the eMBB PUSCH.

In some aspects, scenarios for intra-UE UCI/data may occur when an XR HARQ-ACK collides with other UCIs/data. In some aspects, when an XR HARQ-ACK collides with a URLLC SR, the UE may drop a low priority XR HARQ-ACK or a low priority URLLC SR. When both the XR HARQ-ACK and the URLLC SR are associated with the same priority, the UE may rely on the second stage priority handling. In some aspects, when an XR HARQ-ACK collides with a URLLC HARQ-ACK, the UE may drop a low priority XR HARQ-ACK or a low priority URLLC HARQ-ACK. When both the XR HARQ-ACK and the URLLC HARQ-ACK are associated with the same priority, the UE may rely on the second stage priority handling. In some aspects, when an XR HARQ-ACK collides with P/SP-CSI on a PUCCH, the UE may drop the P/SP-CSI on the PUCCH.

In some aspects, when an XR HARQ-ACK collides with a URLLC PUSCH, the UE may drop a low priority XR HARQ-ACK or a low priority URLLC PUSCH. When both the XR HARQ-ACK and the URLLC PUSCH are associated with the same priority, the UE may rely on the second stage priority handling. In some aspects, when an XR HARQ-ACK collides with an eMBB SR, the UE may drop the eMBB SR. In some aspects, when an XR HARQ-ACK collides with an eMBB HARQ-ACK, the UE may drop the eMBB HARQ-ACK. In some aspects, when an XR HARQ-ACK collides with an eMBB PUSCH, the UE may drop the eMBB PUSCH.

In some aspects, scenarios for intra-UE UCI/data may occur when an XR PUSCH collides with other UCIs/data. In some aspects, when an XR PUSCH collides with a URLLC SR, the UE may drop a low priority XR PUSCH or a low priority URLLC SR. When both the XR PUSCH and the URLLC SR are associated with the same priority, the UE may rely on the second stage priority handling. In some aspects, when an XR PUSCH collides with a URLLC HARQ-ACK, the UE may drop a low priority XR PUSCH or a low priority URLLC HARQ-ACK. When both the XR PUSCH and the URLLC HARQ-ACK are associated with the same priority, the UE may rely on the second stage priority handling. In some aspects, when an XR PUSCH collides with P/SP-CSI on a PUCCH, the UE may drop the P/SP-CSI on the PUCCH.

In some aspects, when an XR PUSCH collides with a URLLC PUSCH, the UE may drop a low priority XR PUSCH or a low priority URLLC PUSCH. When both the XR PUSCH and the URLLC PUSCH are associated with the same priority, the UE may rely on the second stage priority handling. In some aspects, when an XR PUSCH collides with an eMBB SR, the UE may drop the eMBB SR. In some aspects, when an XR PUSCH collides with an eMBB HARQ-ACK, the UE may drop the eMBB HARQ-ACK. In some aspects, when an XR PUSCH collides with an eMBB PUSCH, the UE may drop the eMBB PUSCH.

As shown by reference number 406, the UE may transmit, to the network node, the one of the first traffic or the second traffic that is selected based at least in part on the first stage priority handling and the second stage priority handling. The UE may drop one of the first traffic or the second traffic that is not selected based at least in part on the first stage priority handling and the second stage priority handling. As a result, based at least in part on the first stage priority handling and the second stage priority handling, for the plurality of colliding uplink transmissions, the UE may be able to select a single traffic for transmission to the network node.

As indicated above, FIG. 4 is provided as an example. Other examples may differ from what is described with regard to FIG. 4.

FIG. 5 is a diagram illustrating an example process 500 performed, for example, by a UE, in accordance with the present disclosure. Example process 500 is an example where the UE (e.g., UE 120) performs operations associated with priority handling for XR traffic.

As shown in FIG. 5, in some aspects, process 500 may include determining two or more colliding uplink transmissions, wherein the two or more colliding uplink transmissions include first traffic and second traffic (block 510). For example, the UE (e.g., using communication manager 140 and/or determination component 608, depicted in FIG. 6) may determine two or more colliding uplink transmissions, wherein the two or more colliding uplink transmissions include first traffic and second traffic, as described above.

As further shown in FIG. 5, in some aspects, process 500 may include selecting, from the two or more colliding uplink transmissions, one of the first traffic or the second traffic based at least in part on a first stage priority handling and a second stage priority handling, wherein the first traffic or the second traffic is selected based at least in part on one of three possible priority levels assigned to each of the two or more colliding uplink transmissions (block 520). For example, the UE (e.g., using communication manager 140 and/or selection component 610, depicted in FIG. 6) may select, from the two or more colliding uplink transmissions, one of the first traffic or the second traffic based at least in part on a first stage priority handling and a second stage priority handling, wherein the first traffic or the second traffic is selected based at least in part on one of three possible priority levels assigned to each of the two or more colliding uplink transmissions, as described above.

As further shown in FIG. 5, in some aspects, process 500 may include transmitting, to a network node, the one of the first traffic or the second traffic that is selected (block 530). For example, the UE (e.g., using communication manager 140 and/or transmission component 604, depicted in FIG. 6) may transmit, to a network node, the one of the first traffic or the second traffic that is selected, as described above.

Process 500 may include additional aspects, such as any single aspect or any combination of aspects described below and/or in connection with one or more other processes described elsewhere herein.

In a first aspect, process 500 includes dropping one of the first traffic or the second traffic that is not selected.

In a second aspect, alone or in combination with the first aspect, the first stage priority handling is based at least in part on a two-level priority assigned to the two or more colliding uplink transmissions, wherein the two-level priority includes a high priority and a low priority, wherein the first traffic and the second traffic are associated with the high priority and remaining traffic from the two or more colliding uplink transmissions are associated with the low priority, and the second stage priority handing is based at least in part on a third level priority associated with a delay budget.

In a third aspect, alone or in combination with one or more of the first and second aspects, the first traffic is XR traffic and the second traffic is XR traffic, or the first traffic is XR traffic and the second traffic is non-XR traffic, wherein the non-XR traffic includes URLLC traffic.

In a fourth aspect, alone or in combination with one or more of the first through third aspects, process 500 includes selecting one of the first traffic or the second traffic, using the second stage priority handling, based at least in part on a delay budget associated with the first traffic and the second traffic, wherein the delay budget is one of a PDB, a PDU set delay budget, a PDCP discard time, a remaining PDB, or a delay metric that accounts for jitter.

In a fifth aspect, alone or in combination with one or more of the first through fourth aspects, process 500 includes selecting one of the first traffic or the second traffic, using the second stage priority handling, based at least in part on 5QI metrics for QoS flows, wherein the 5QI metrics for the QoS flows include one or more of a default priority level, a PDB, or a packet error rate.

In a sixth aspect, alone or in combination with one or more of the first through fifth aspects, process 500 includes selecting one of the first traffic or the second traffic, using the second stage priority handling, based at least in part on a mapping to an UP frame prioritization indicated by one or more of the first traffic or the second traffic.

In a seventh aspect, alone or in combination with one or more of the first through sixth aspects, process 500 includes selecting one of the first traffic or the second traffic, using the second stage priority handling, based at least in part on an adaptive delay metric in relation to a threshold.

In an eighth aspect, alone or in combination with one or more of the first through seventh aspects, process 500 includes receiving, from the network node, one or more metrics via a static configuration or a dynamic indication, wherein the second stage priority handling is based at least in part on the one or more metrics.

In a ninth aspect, alone or in combination with one or more of the first through eighth aspects, process 500 includes determining, based at least in part on the first stage priority handling, that the first traffic collides with third traffic from the two or more colliding uplink transmissions, and that the first traffic has a higher priority than the third traffic.

In a tenth aspect, alone or in combination with one or more of the first through ninth aspects, process 500 includes the first traffic is one of an XR SR, an XR HARQ-ACK feedback, or an XR PUSCH transmission, and the third traffic is one of P/SP-CSI on a PUCCH, an eMBB SR, an eMBB HARQ-ACK feedback, or an eMBB PUSCH transmission.

In an eleventh aspect, alone or in combination with one or more of the first through tenth aspects, process 500 includes the first traffic is one of an XR SR, an XR HARQ-ACK feedback, or an XR PUSCH transmission, and the second traffic is one of a URLLC SR, a URLLC HARQ-ACK feedback, or a URLLC PUSCH transmission.

In a twelfth aspect, alone or in combination with one or more of the first through eleventh aspects, one of the first traffic or the second traffic is dropped based at least in part on a low priority associated with the first traffic or the second traffic.

In a thirteenth aspect, alone or in combination with one or more of the first through twelfth aspects, the first traffic and the second traffic are associated with a same priority, and the one of the first traffic or the second traffic is selected based at least in part on the second stage priority handling.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
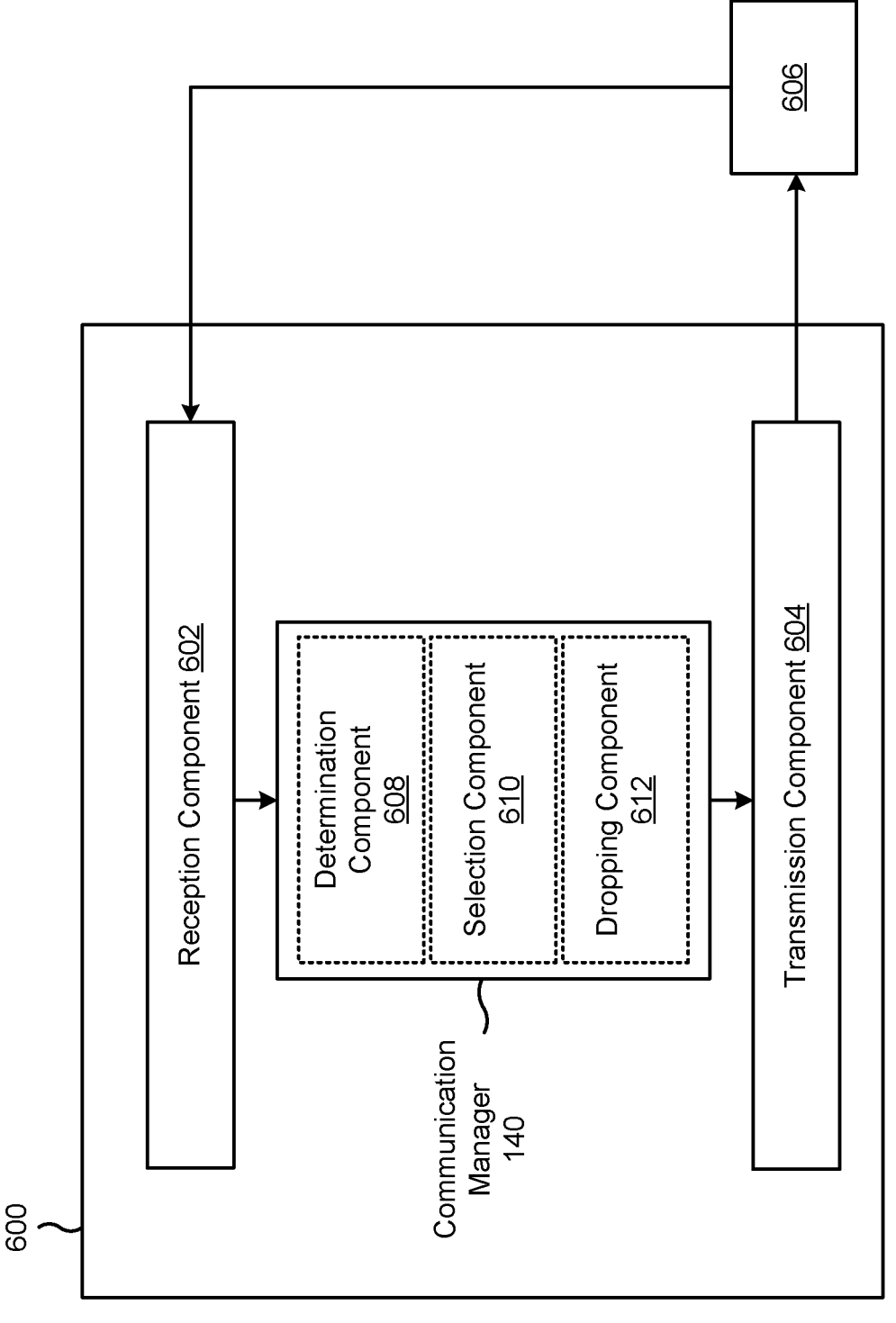
FIG. 6 is a diagram of an example apparatus for wireless communication, in accordance with the present disclosure.

FIG. 6 is a diagram of an example apparatus 600 for wireless communication, in accordance with the present disclosure. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include the communication manager 140. The communication manager 140 may include one or more of a determination component 608, a selection component 610, or a dropping component 612, among other examples.

In some aspects, the apparatus 600 may be configured to perform one or more operations described herein in connection with FIG. 4. Additionally, or alternatively, the apparatus 600 may be configured to perform one or more processes described herein, such as process 500 of FIG. 5. In some aspects, the apparatus 600 and/or one or more components shown in FIG. 6 may include one or more components of the UE described in connection with FIG. 2. Additionally, or alternatively, one or more components shown in FIG. 6 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 600. In some aspects, the reception component 602 may include one or more antennas, a modem, a demodulator, a MIMO detector, a receive processor, a controller/processor, a memory, or a combination thereof, of the UE described in connection with FIG. 2.

The transmission component 604 may transmit communications, such as reference signals, control information, data communications, or a combination thereof, to the apparatus 606. In some aspects, one or more other components of the apparatus 600 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modem, a modulator, a transmit MIMO processor, a transmit processor, a controller/processor, a memory, or a combination thereof, of the UE described in connection with FIG. 2. In some aspects, the transmission component 604 may be co-located with the reception component 602 in a transceiver.

The determination component 608 may determine two or more colliding uplink transmissions, wherein the two or more colliding uplink transmissions include first traffic and second traffic. The selection component 610 may select, from the two or more colliding uplink transmissions, one of the first traffic or the second traffic based at least in part on a first stage priority handling and a second stage priority handling, wherein the first traffic or the second traffic is selected based at least in part on one of three possible priority levels assigned to each of the two or more colliding uplink transmissions. The transmission component 604 may transmit, to a network node, the one of the first traffic or the second traffic that is selected. The dropping component 612 may drop one of the first traffic or the second traffic that is not selected.

The selection component 610 may select one of the first traffic or the second traffic, using the second stage priority handling, based at least in part on a delay budget associated with the first traffic and the second traffic, wherein the delay budget is one of: a PDB, a PDU set delay budget, a PDCP discard time, a remaining PDB, or a delay metric that accounts for jitter. The selection component 610 may select one of the first traffic or the second traffic, using the second stage priority handling, based at least in part on 5QI metrics for QoS flows, wherein the 5QI metrics for the QoS flows include one or more of a default priority level, a packet delay budget, or a packet error rate.

The selection component 610 may select one of the first traffic or the second traffic, using the second stage priority handling, based at least in part on a mapping to an I/P frame prioritization indicated by one or more of the first traffic or the second traffic. The selection component 610 may select one of the first traffic or the second traffic, using the second stage priority handling, based at least in part on an adaptive delay metric in relation to a threshold.

The reception component 602 may receive, from the network node, one or more metrics via a static configuration or a dynamic indication, wherein the second stage priority handling is based at least in part on the one or more metrics. The determination component 608 may determine, based at least in part on the first stage priority handling, that the first traffic collides with third traffic from the two or more colliding uplink transmissions, and that the first traffic has a higher priority than the third traffic.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

The following provides an overview of some Aspects of the present disclosure:

Aspect 1: A method of wireless communication performed by a user equipment (UE), comprising: determining two or more colliding uplink transmissions, wherein the two or more colliding uplink transmissions include first traffic and second traffic; selecting, from the two or more colliding uplink transmissions, one of the first traffic or the second traffic based at least in part on a first stage priority handling and a second stage priority handling, wherein the first traffic or the second traffic is selected based at least in part on one of three possible priority levels assigned to each of the two or more colliding uplink transmissions; and transmitting, to a network node, the one of the first traffic or the second traffic that is selected.

Aspect 2: The method of Aspect 1, further comprising: dropping one of the first traffic or the second traffic that is not selected.

Aspect 3: The method of any of Aspects 1 through 2, wherein the first stage priority handling is based at least in part on a two-level priority assigned to the two or more colliding uplink transmissions, wherein the two-level priority includes a high priority and a low priority, wherein the first traffic and the second traffic are associated with the high priority and remaining traffic from the two or more colliding uplink transmissions are associated with the low priority, and wherein the second stage priority handing is based at least in part on a third level priority associated with a delay budget.

Aspect 4: The method of any of Aspects 1 through 3, wherein: the first traffic is extended reality (XR) traffic and the second traffic is XR traffic; or the first traffic is XR traffic and the second traffic is non-XR traffic, wherein the non-XR traffic includes ultra-reliable low latency communications traffic.

Aspect 5: The method of any of Aspects 1 through 4, wherein selecting one of the first traffic or the second traffic, using the second stage priority handling, is based at least in part on a delay budget associated with the first traffic and the second traffic, wherein the delay budget is one of: a packet delay budget (PDB), a protocol data unit (PDU) set delay budget, a packet data convergence protocol (PDCP) discard time, a remaining PDB, or a delay metric that accounts for jitter.

Aspect 6: The method of any of Aspects 1 through 5, wherein selecting one of the first traffic or the second traffic, using the second stage priority handling, is based at least in part on Fifth Generation quality of service (QoS) identifier (5QI) metrics for QoS flows, wherein the 5QI metrics for the QoS flows include one or more of a default priority level, a packet delay budget, or a packet error rate.

Aspect 7: The method of any of Aspects 1 through 6, wherein selecting one of the first traffic or the second traffic, using the second stage priority handling, is based at least in part on a mapping to an intra frame or predicted frame prioritization indicated by one or more of the first traffic or the second traffic.

Aspect 8: The method of any of Aspects 1 through 7, wherein selecting one of the first traffic or the second traffic, using the second stage priority handling, is based at least in part on an adaptive delay metric in relation to a threshold.

Aspect 9: The method of any of Aspects 1 through 8, further comprising: receiving, from the network node, one or more metrics via a static configuration or a dynamic indication, wherein the second stage priority handling is based at least in part on the one or more metrics.

Aspect 10: The method of any of Aspects 1 through 9, further comprising: determining, based at least in part on the first stage priority handling, that the first traffic collides with third traffic from the two or more colliding uplink transmissions, and that the first traffic has a higher priority than the third traffic.

Aspect 11: The method of Aspect 10, wherein: the first traffic is one of: an extended reality (XR) scheduling request (SR), an XR hybrid automatic repeat request acknowledgement (HARQ-ACK) feedback, or an XR physical uplink shared channel (PUSCH) transmission; and the third traffic is one of: persistent or semi-persistent channel state information on a physical uplink control channel, an enhanced Mobile Broadband (eMBB) SR, an eMBB HARQ-ACK feedback, or an eMBB PUSCH transmission.

Aspect 12: The method of any of Aspects 1 through 11, wherein: the first traffic is one of: an extended reality (XR) scheduling request (SR), an XR hybrid automatic repeat request acknowledgement (HARQ-ACK) feedback, or an XR physical uplink shared channel (PUSCH) transmission; and the second traffic is one of: an ultra-reliable low latency communications (URLLC) SR, a URLLC HARQ-ACK feedback, or a URLLC PUSCH transmission.

Aspect 13: The method of Aspect 12, wherein one of the first traffic or the second traffic is dropped based at least in part on a low priority associated with the first traffic or the second traffic.

Aspect 14: The method of Aspect 12, wherein the first traffic and the second traffic are associated with a same priority, and wherein the one of the first traffic or the second traffic is selected based at least in part on the second stage priority handling.

Aspect 15: An apparatus for wireless communication at a device, comprising a processor; memory coupled with the processor; and instructions stored in the memory and executable by the processor to cause the apparatus to perform the method of one or more of Aspects 1-14.

Aspect 16: A device for wireless communication, comprising a memory and one or more processors coupled to the memory, the one or more processors configured to perform the method of one or more of Aspects 1-14.

Aspect 17: An apparatus for wireless communication, comprising at least one means for performing the method of one or more of Aspects 1-14.

Aspect 18: A non-transitory computer-readable medium storing code for wireless communication, the code comprising instructions executable by a processor to perform the method of one or more of Aspects 1-14.

Aspect 19: A non-transitory computer-readable medium storing a set of instructions for wireless communication, the set of instructions comprising one or more instructions that, when executed by one or more processors of a device, cause the device to perform the method of one or more of Aspects 1-14.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
a memory; and
one or more processors, coupled to the memory, configured to:
determine two or more colliding uplink transmissions, wherein the two or more colliding uplink transmissions include first traffic and second traffic;
select, from the two or more colliding uplink transmissions, the first traffic and the second traffic based at least in part on a first stage priority handling, wherein the first stage priority handling is based at least in part on a two-level priority assigned to the two or more colliding uplink transmissions, wherein the two-level priority includes a first level priority and a second level priority;
select one of the first traffic or the second traffic based at least in part on a second stage priority handling, wherein the second stage priority handing is based at least in part on a third level priority associated with a Fifth Generation quality of service (QoS) identifier (5QI) metric for QoS flows associated with the first traffic and the second traffic, and wherein the 5QI metric for the QoS flows is a packet error rate or a packet delay budget; and
transmit, to a network node, the one of the first traffic or the second traffic that is selected.

2. The apparatus of claim 1, wherein the one or more processors are further configured to:
drop one of the first traffic or the second traffic that is not selected.

3. The apparatus of claim 1, wherein the first traffic and the second traffic are associated with a higher priority than remaining traffic from the two or more colliding uplink transmissions.

4. The apparatus of claim 1, wherein:
the first traffic is extended reality (XR) traffic and the second traffic is XR traffic; or
the first traffic is XR traffic and the second traffic is non-XR traffic, wherein the non-XR traffic includes ultra-reliable low latency communications traffic.

5. The apparatus of claim 1, wherein the one or more processors are configured to select one of the first traffic or the second traffic, using the second stage priority handling, based at least in part on a delay budget associated with the first traffic and the second traffic, wherein the delay budget is one of: a packet delay budget (PDB), a protocol data unit (PDU) set delay budget, a packet data convergence protocol (PDCP) discard time, a remaining PDB, or a delay metric that accounts for jitter.

6. The apparatus of claim 1, wherein the one or more processors are configured to select one of the first traffic or the second traffic, using the second stage priority handling, based at least in part on a mapping to an intra frame or predicted frame prioritization indicated by one or more of the first traffic or the second traffic.

7. The apparatus of claim 1, wherein the one or more processors are configured to select one of the first traffic or the second traffic, using the second stage priority handling, based at least in part on an adaptive delay metric in relation to a threshold.

8. The apparatus of claim 1, wherein the one or more processors are further configured to:
receive, from the network node, one or more metrics via a static configuration or a dynamic indication, wherein the second stage priority handling is based at least in part on the one or more metrics.

9. The apparatus of claim 1, wherein the one or more processors are further configured to:
determine, based at least in part on the first stage priority handling, that the first traffic collides with third traffic from the two or more colliding uplink transmissions, and that the first traffic has a higher priority than the third traffic.

10. The apparatus of claim 9, wherein:
The first traffic is one of: an extended reality (XR) scheduling request (SR), an XR hybrid automatic repeat request acknowledgement (HARQ-ACK) feedback, or an XR physical uplink shared channel (PUSCH) transmission; and
the third traffic is one of: persistent or semi-persistent channel state information on a physical uplink control channel, an enhanced Mobile Broadband (eMBB) SR, an eMBB HARQ-ACK feedback, or an eMBB PUSCH transmission.

11. The apparatus of claim 1, wherein:

the first traffic is one of: an extended reality (XR) scheduling request (SR), an XR hybrid automatic repeat request acknowledgement (HARQ-ACK) feedback, or an XR physical uplink shared channel (PUSCH) transmission; and the second traffic is one of: an ultra-reliable low latency communications (URLLC) SR, a URLLC HARQ-ACK feedback, or a URLLC PUSCH transmission.

12. The apparatus of claim 11, wherein one of the first traffic or the second traffic is dropped based at least in part on a low priority associated with the first traffic or the second traffic.

13. The apparatus of claim 11, wherein the first traffic and the second traffic are associated with a same priority, and wherein the one of the first traffic or the second traffic is selected based at least in part on the second stage priority handling.

14. A method of wireless communication performed by a user equipment (UE), comprising:

determining two or more colliding uplink transmissions, wherein the two or more colliding uplink transmissions include first traffic and second traffic;

selecting, from the two or more colliding uplink transmissions, the first traffic and the second traffic based at least in part on a first stage priority handling, wherein the first stage priority handling is based at least in part on a two-level priority assigned to the two or more colliding uplink transmissions, wherein the two-level priority includes a first level priority and a second level priority;

selecting one of the first traffic or the second traffic based at least in part on a second stage priority handling, wherein the second stage priority handing is based at least in part on a third level priority associated with a Fifth Generation quality of service (QoS) identifier (5QI) metric for QoS flows associated with the first traffic and the second traffic, and wherein the 5QI metric for the QoS flows is a packet error rate or a packet delay budget; and transmitting, to a network node, the one of the first traffic or the second traffic that is selected.

15. The method of claim 14, further comprising:

dropping one of the first traffic or the second traffic that is not selected.

16. The method of claim 14, wherein the first traffic and the second traffic are associated with a higher priority than remaining traffic from the two or more colliding uplink transmissions.

17. The method of claim 14, wherein:

the first traffic is extended reality (XR) traffic and the second traffic is XR traffic; or the first traffic is XR traffic and the second traffic is non-XR traffic, wherein the non-XR traffic includes ultra-reliable low latency communications traffic.

18. The method of claim 14, wherein selecting one of the first traffic or the second traffic, using the second stage priority handling, is based at least in part on a delay budget associated with the first traffic and the second traffic, wherein the delay budget is one of: a packet delay budget (PDB), a protocol data unit (PDU) set delay budget, a packet data convergence protocol (PDCP) discard time, a remaining PDB, or a delay metric that accounts for jitter.

19. The method of claim 14, wherein selecting one of the first traffic or the second traffic, using the second stage priority handling, is based at least in part on a mapping to an intra frame or predicted frame prioritization indicated by one or more of the first traffic or the second traffic.

20. The method of claim 14, wherein selecting one of the first traffic or the second traffic, using the second stage priority handling, is based at least in part on an adaptive delay metric in relation to a threshold.

21. The method of claim 14, further comprising:

receiving, from the network node, one or more metrics via a static configuration or a dynamic indication, wherein the second stage priority handling is based at least in part on the one or more metrics.

22. The method of claim 14, further comprising:

determining, based at least in part on the first stage priority handling, that the first traffic collides with third traffic from the two or more colliding uplink transmissions, and that the first traffic has a higher priority than the third traffic.

23. The method of claim 22, wherein:

the first traffic is one of: an extended reality (XR) scheduling request (SR), an XR hybrid automatic repeat request acknowledgement (HARQ-ACK) feedback, or an XR physical uplink shared channel (PUSCH) transmission; and the third traffic is one of: persistent or semi-persistent channel state information on a physical uplink control channel, an enhanced Mobile Broadband (eMBB) SR, an eMBB HARQ-ACK feedback, or an eMBB PUSCH transmission.

24. The method of claim 14, wherein:

the first traffic is one of: an extended reality (XR) scheduling request (SR), an XR hybrid automatic repeat request acknowledgement (HARQ-ACK) feedback, or an XR physical uplink shared channel (PUSCH) transmission; and the second traffic is one of: an ultra-reliable low latency communications (URLLC) SR, a URLLC HARQ-ACK feedback, or a URLLC PUSCH transmission.

25. The method of claim 24, wherein one of the first traffic or the second traffic is dropped based at least in part on a low priority associated with the first traffic or the second traffic.

26. The method of claim 24, wherein the first traffic and the second traffic are associated with a same priority, and wherein the one of the first traffic or the second traffic is selected based at least in part on the second stage priority handling.

27. A non-transitory computer-readable medium storing a set of instructions for wireless communication, the set of instructions comprising:

one or more instructions that, when executed by one or more processors of a user equipment (UE), cause the UE to:

determine two or more colliding uplink transmissions, wherein the two or more colliding uplink transmissions include first traffic and second traffic;

select, from the two or more colliding uplink transmissions, the first traffic and the second traffic based at least in part on a first stage priority handling, wherein the first stage priority handling is based at least in part on a two-level priority assigned to the two or more colliding uplink transmissions, wherein the two-level priority includes a first level priority and a second level priority;

select one of the first traffic or the second traffic based at least in part on a second stage priority handling, wherein the second stage priority handing is based at least in part on a third level priority associated with a Fifth Generation quality of service (QoS) identifier (5QI) metric for QoS flows associated with the first traffic and the second traffic, and wherein the 5QI metric for the QoS flows is a packet error rate or a packet delay budget; and transmit, to a network node, the one of the first traffic or the second traffic that is selected.

28. The non-transitory computer-readable medium of claim 27, wherein the first traffic and the second traffic are associated with a higher priority than remaining traffic from the two or more colliding uplink transmissions.

29. The non-transitory computer-readable medium of claim 27, wherein:

the first traffic is extended reality (XR) traffic and the second traffic is XR traffic; or the first traffic is XR traffic and the second traffic is non-XR traffic, wherein the non-XR traffic includes ultra-reliable low latency communications traffic.

30. An apparatus for wireless communication, comprising:

means for determining two or more colliding uplink transmissions, wherein the two or more colliding uplink transmissions include first traffic and second traffic;

means for selecting, from the two or more colliding uplink transmissions, the first traffic and the second traffic based at least in part on a first stage priority handling, wherein the first stage priority handling is based at least in part on a two-level priority assigned to the two or more colliding uplink transmissions, wherein the two-level priority includes a first level priority and a second level priority;

means for selecting one of the first traffic or the second traffic based at least in part on a second stage priority handling, wherein the second stage priority handing is based at least in part on a third level priority associated with a Fifth Generation quality of service (QoS) identifier (5QI) metric for QoS flows associated with the first traffic and the second traffic, wherein the 5QI metric for the QoS flows is a packet error rate or a packet delay budget; and means for transmitting, to a network node, the one of the first traffic or the second traffic that is selected.

* * * * *